Dec. 30, 1952     S. W. COMPTON ET AL     2,623,552
SIDE CUTTING ROTARY TOOL
Filed Dec. 30, 1949

INVENTORS
SHERMAN W. COMPTON
JOHN G. HALL
BY McMorrow, Berman & Davidson
ATTORNEYS Patented Dec. 30, 1952

2,623,552

UNITED STATES PATENT OFFICE 2,623,552

SIDE CUTTING ROTARY TOOL

Sherman W. Compton, Martinsburg, and John G. Hall, Reedsville, W. Va.

Application December 30, 1949, Serial No. 136,094

4 Claims. (Cl. 143—133)

1

This invention relates to rotatable bits, and more particularly to a bit for cutting a work piece upon relative movement of the bit and work piece laterally of the bit.

It is among the objects of the invention to provide a rotatable bit especially designed for rapid side cutting through a work piece upon relative movement of the bit and the work piece laterally of the bit, which bit is also effective to drill holes in the work piece and, upon proper rotation, move the cuttings downwardly of the work piece so that lines or marks on the upper surface of the work piece are not obscured by the cuttings, and which is strong and durable in construction, economical to manufacture, and easy to use.

Other objects and advantages will become apparent from a consideration of the following description and the appended claims in conjunction with the accompanying drawing wherein:

Figure 1:
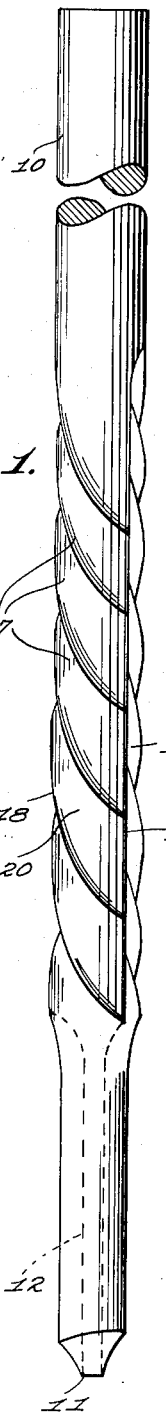
Figure 1 is a side elevation of a rotatable bit illustrative of the invention.

With continued reference to the drawing, the bit is an elongated generally cylindrical body having at one end a smooth cylindrical shank 10 for reception in a suitable chuck. The opposite end of the body is oppositely beveled to provide a cutting point 11 and the body is provided with two diametrically opposed rounded grooves 12 which extend from the point 11 longitudinally of the body a distance sufficient to provide an efficient cutting tip at this end of the bit. These grooves have a width only slightly less than the diameter of the drill body, so that the grooved portion of the body is flattened, as particularly illustrated in Figure 1, and a sharp cutting edge is provided along at least one side of each of these longitudinally extending grooves. The grooves provide a passageway for chips or cuttings to move from the point 11 along the bit and out of a hole being drilled by the bit when the bit is being used to drill a hole in a work piece.

Between the hole drilling or grooved tip of the bit and the smooth shank 10, the body is provided with two spaced apart longitudinal rows of contiguous side cutting teeth.

2

In the arrangement illustrated, there are two rows 13 and 14 of side cutting teeth diametrically opposed and each having a circumferential width somewhat less than 180 degrees, the two rows being separated at their adjacent edges by straight undercut grooves 15 and 16.

While two rows of side cutting teeth have been illustrated for the purpose of disclosing the invention, it is to be understood that as many rows of teeth may be provided as may be found desirable or necessary, and that the adjacent edges of each two adjacent rows will be separated by a corresponding groove extending longitudinally of the drill body. It is contemplated that two rows will ordinarily be sufficient for a small bit, but that three or more rows may be found necessary or desirable for large bits.

Each row of teeth comprises a series of contiguous teeth 17 and each of these teeth has a spiral outer edge 18 which extends around the bit and at the same time, extends away from the shank 10 of the bit in the direction of bit rotation.

The surface of the tooth at the side of the spiral edge 18 adjacent the grooved end portion of the bit is undercut, as indicated at 19, to constitute the edge 18 a cutting edge, and the surface 19 tapers gradually in width from the groove at the end of the tooth at which the spiral edge 18 is furtherest from the shank 10 of the bit and nearest the grooved tip 12 to the groove at the opposite end of the tooth.

The surface 20 of the tooth at the side of the spiral edge 18 adjacent the smooth shank 10 of the bit is inclined from the edge 18 to the bottom of the undercut surface 19 of the next adjacent tooth toward the shank 10 of the bit.

Figure 3:
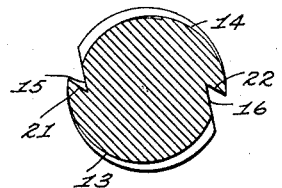
Figure 3 is a transverse cross section on a somewhat enlarged scale on the line 3—3 of Figure 2.

Each tooth is thus so shaped that the spiral edge 18 constitutes a cutting edge for the tooth to remove cuttings at the ends of a slot or cut as it is made in the work piece by the bit and force these cuttings downwardly of the work piece through the cut. The grooves 15 and 16 have their sides at the narrower ends of the undercut tooth surfaces 19 undercut, as indicated at 21 and 22 in Figure 3, to provide a sharp cutting or scraping edge at the corresponding ends of the teeth and cutting points on the teeth at such ends thereof.

The grooves 15 and 16 extend longitudinally of the bit and are preferably straight, but may be spirally curved, if desired, without in any way exceeding the scope of the invention.

The rows of side cutting teeth are made of sufficient length to extend entirely through a work piece of the maximum thickness which can be easily cut by the particular size bit, although these rows may be made shorter, if desired, without in any way exceeding the scope of the invention.

Figure 2:
Figure 2 is a side elevation of the bit rotated through an angle of approximately 90-degrees from the position illustrated in Figure 1.
Figure 4:
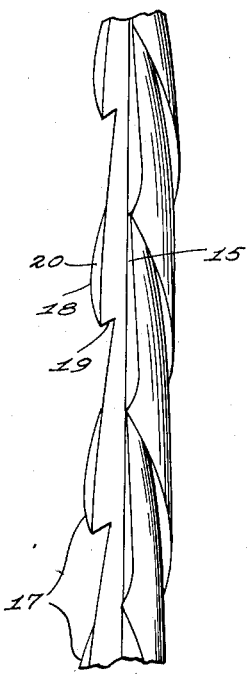
Figure 4 is an elevation of a fragmentary portion of a somewhat modified form of bit.

In the form of the invention illustrated in Figures 1 and 2, the teeth in each row of teeth are so shaped and spaced that adjacent teeth overlap each other so that the teeth of each row clean and smooth the end of the slot or cut as it is rotated past such end of the cut. Under some conditions it has been found desirable to have the teeth disposed at greater intervals along the bit, and in the construction illustrated in Figure 4, alternate teeth in each row are omitted and the teeth in the two rows are staggered so that each tooth in one row overlaps a corresponding tooth in the other row. Otherwise, the shape of the teeth in the modified form illustrated in Figure 4 is the same as that in the form of the invention illustrated in Figures 1 and 2, and described above.

The bit may be made in different sizes and lengths and with teeth of different sizes and arrangements to accommodate the bit to the characteristics of different kinds of work pieces and to various operating conditions, and such a side cutting bit, when operatively mounted in a power operated drill press or similar device, will perform the functions of a jig or scroll saw and accomplish the operation much more smoothly, effectively, and rapidly than such a saw.

The improved side cutting bit also saves a large amount of time in scroll and jig saw operations since it will first drill its own hole through the work piece and then, upon relative movement of the bit and work piece laterally of the bit, will cut a slot or saw cut in the work piece along any desired line.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In side-cutting rotary drill bit, a cylindrical bit body formed with straight circumferentially spaced, longitudinally extending first grooves, sides of said body in line with said first grooves being flattened and formed with second grooves defining straight longitudinal cutting edges on at least one side of the second grooves, said first grooves defining rows therebetween, said rows being formed with longitudinally succeeding teeth spiralling in the direction of rotation of the bit, the ends of the teeth facing in said direction being undercut, and one side of said first grooves intersecting the laterally outward surfaces of the teeth to define longitudinally curved cutting edges on the teeth.

2. In side-cutting rotary drill bit, a cylindrical bit body formed with straight circumferentially spaced, longitudinally extending first grooves, sides of said body in line with said first grooves being flattened and formed with second grooves defining straight longitudinal cutting edges on at least one side of the second grooves, said first grooves defining rows therebetween, said rows being formed with longitudinally succeeding teeth spiralling in the direction of rotation of the bit, the ends of the teeth facing in said direction being undercut, and one side of said first grooves intersecting the laterally outward surfaces of the teeth to define longitudinally curved cutting edges on the teeth, the teeth being longitudinally elongated.

3. In side-cutting rotary drill bit, a cylindrical bit body formed with straight circumferentially spaced, longitudinally extending first grooves, sides of said body in line with said first grooves being flattened and formed with second grooves defining straight longitudinal cutting edges on at least one side of the second grooves, said first grooves defining rows therebetween, said rows being formed with longitudinally succeeding teeth spiralling in the direction of rotation of the bit, the ends of the teeth facing in said direction being undercut, and one side of said first grooves intersecting the laterally outward surfaces of the teeth to define longitudinally curved cutting edges on the teeth, the teeth of adjacent rows being longitudinally staggered.

4. In a side-cutting drill bit, a cylindrical bit body formed with circumferentially spaced grooves defining rows therebetween, said rows being formed with longitudinally succeeding teeth spiralling in the direction of rotation of the bit, the ends of the teeth facing an end of the bit body being undercut, the laterally outward surfaces of the teeth having longitudinally curved surfaces defining cutting edges, the teeth being longitudinally elongated.

SHERMAN W. COMPTON.
JOHN G. HALL.

REFERENCES CITED

The following references are of record in the file of this patent:

UNITED STATES PATENTS

| Number | Name | Date |
| --- | --- | --- |
| 407,868 | Middleton | July 30, 1889 |
| 1,307,525 | Trebert | June 24, 1919 |
| 1,328,430 | Hathaway | Jan. 20, 1920 |
| 1,425,893 | Olson | Aug. 15, 1922 |
| 2,101,583 | Honneknovel | Dec. 7, 1937 |
| 2,238,578 | Burkeman | Apr. 15, 1941 |
| 2,437,669 | Adams | Mar. 16, 1948 |

FOREIGN PATENTS

| Number | Country | Date |
| --- | --- | --- |
| 245,301 | Great Britain | Jan. 7, 1926 |